(12) United States Patent
Hoshishima et al.

(10) Patent No.: US 9,182,422 B2
(45) Date of Patent: Nov. 10, 2015

(54) FLUID BODY FLOW VISUALIZATION DEVICE AND VISUALIZATION METHOD

(75) Inventors: Kazuteru Hoshishima, Tamano (JP); Noriaki Kimura, Tamano (JP)

(73) Assignee: MITSUI ENGINEERING & SHIPBUILDING, Tokyo (JP)

( * ) Notice: Subject to any disclaimer, the term of this patent is extended or adjusted under 35 U.S.C. 154(b) by 330 days.

(21) Appl. No.: 13/883,961

(22) PCT Filed: Nov. 4, 2011

(86) PCT No.: PCT/JP2011/006168
§ 371 (c)(1),
(2), (4) Date: May 7, 2013

(87) PCT Pub. No.: WO2012/063442
PCT Pub. Date: May 18, 2012

(65) Prior Publication Data
US 2013/0220009 A1 Aug. 29, 2013

(30) Foreign Application Priority Data
Nov. 8, 2010 (JP) ................................. 2010-249725

(51) Int. Cl.
*G01N 21/00* (2006.01)
*G01P 13/00* (2006.01)
*G01M 9/06* (2006.01)
(Continued)

(52) U.S. Cl.
CPC ........... *G01P 13/0093* (2013.01); *G01M 9/067* (2013.01); *G01P 5/001* (2013.01); *G01S 17/89* (2013.01)

(58) Field of Classification Search
CPC combination set(s) only.
See application file for complete search history.

(56) References Cited

U.S. PATENT DOCUMENTS

| | | | |
|---|---|---|---|
| 5,127,264 A | 7/1992 | Schmalz | |
| 7,466,400 B2 * | 12/2008 | Luther et al. | ............. 356/70 |

FOREIGN PATENT DOCUMENTS

| | | | |
|---|---|---|---|
| JP | 59-195163 A | 11/1984 | |
| JP | 05-052523 A | 3/1993 | |
| JP | 05-264397 A | 10/1993 | |

(Continued)

OTHER PUBLICATIONS

International Search Report of corresponding International Application No. PCT/JP20111006168, dated on Jan. 24, 2012.
(Continued)

*Primary Examiner* — Tri T Ton
(74) *Attorney, Agent, or Firm* — Global IP Counselors, LLP

(57) ABSTRACT

When a flow of a liquid body around a measuring object is visualized, a first liquid body as a tracer is supplied from a nozzle hole into a flow field of a second liquid body, and a laser beam having a wavelength optically absorbed by the first liquid body is irradiated in a manner such that the laser beam traverse across the flow field. At this point, the irradiation position of the laser beam is controlled in such a manner that the flow field is scanned with the laser beam. On the other hand, the laser beam that has passed through the flow field is received and a position where the first liquid body traverses the laser beam is obtained using the scan intensity signal of the received laser beam so that the flow of the second liquid body is visualized. The position where the first liquid body traverses the laser beam can be obtained based on a position on a time axis where a value of the scan intensity signal is less than a set threshold. According to the above described visualization, the flow field can reliably be visualized even for the high-speed fluid body.

12 Claims, 4 Drawing Sheets

(51) Int. Cl.
*G01P 5/00* (2006.01)
*G01S 17/89* (2006.01)

(56) References Cited

FOREIGN PATENT DOCUMENTS

| JP | 2001-356130 A | 12/2001 |
| JP | 2003-084005 A | 3/2003 |
| JP | 2004-069396 A | 3/2004 |

OTHER PUBLICATIONS

Brucker C, "Digital-Particle-Image-Velocimetry (DPIV) in a scanning light-sheet: 3D starting flow around a short cylinder", Experiments in Fluids, Springer, vol. 19, No. 4, Aug. 1, 1995, pp. 255-263, Heidelberg, DE.
Extended European Search Report of the corresponding European Application No. 11840281.7, dated Apr. 11, 2014.

* cited by examiner

FLUID BODY FLOW VISUALIZATION DEVICE AND VISUALIZATION METHOD

TECHNICAL FIELD

The present invention relates to a fluid body flow visualization device and a visualization method for visualizing a flow of a fluid body around a measuring object.

BACKGROUND ART

Nowadays, a product that is excellent in regard to air resistance has been developed by visualizing the flow of the fluid body around a measuring object.

Generally, in the case that the flow of the fluid body is visualized, a tracer is flown in the fluid body, the tracer which is dispersed along the fluid body is captured as an image, and the image is observed to visualize the flow of the fluid body. For example, a fluorescent microparticle, an oil smoke, and a hydrogen bubble are used as the tracer.

However, by the method in which the tracer is used, when the high-speed fluid body in which a speed of the fluid body is 50 m/s or more is used as the fluid body, the tracer is dispersed at once, and the tracer is hardly recognized as a streamline in an image on which the dispersed state is captured. In the case that the amount of tracer is largely increased, an influence of the large amount of tracer on the flow of the fluid body may not be negligible.

It is also necessary to recover the tracer, which has once dispersed, on a downstream side of the fluid body that has passed around the measuring object.

On the other hand, there are known streamline observation method and device therefor, in which a liquid that generates a smoke by temperature rise is applied to a thin wire traversing a small wind tunnel and the streamline is visualized using the smoke generated by electric heating of the thin wire (Patent Literature 1).

In the streamline observation method and device therefor, the liquid that generates the smoke by the temperature rise is applied to the thin wire traversing the wind tunnel, and the streamline is visualized using the smoke generated by the electric heating of the thin wire. At this point, a thin tube in which long and thin slit-like gaps or micro holes are formed in a tube axis direction is used as the thin wire, and the electric heating of the thin tube is performed while the liquid that generates the smoke is flown in the thin tube.

The long and thin slit-like gaps or the micro holes are formed in the tube axis direction of the thin tube, and the liquid that generates the smoke is flown in the thin tube. Therefore, the liquid evenly penetrates the long and thin slit-like gaps or the micro holes, and uniformly generates smoke by the electric heating.

CITATION LIST

Patent Literature

Patent Literature 1: JP-A-5-264397

However, even with the streamline observation method and device therefor, the streamline is hardly visualized for the high-speed fluid body in which the speed of the fluid body is 50 m/s or more.

SUMMARY OF INVENTION

Technical Problem

In view of the foregoing, an object of the present invention is to provide a fluid body flow visualization device and a visualization method capable of reliably visualizing the flow field even for the high-speed fluid body.

An aspect of the present invention is a fluid body flow visualization device for visualizing a flow of a fluid body around a measuring object. The device includes:

a fluid body supply unit operable to supply a first fluid body as a tracer from a nozzle hole to a flow field of a second fluid body;

a laser beam supply unit operable to irradiate the flow field with a laser beam having a wavelength optically absorbed by the first fluid body in a manner such that the laser beam traverses the flow field, and operable to control an irradiation position of the laser beam in a manner such that the flow field is scanned;

a beam receiving unit operable to receive the laser beam which has traversed the flow field; and a processing unit operable to visualize a flow of the second fluid body in the flow field using a scan intensity signal of the received laser beam.

Preferably, the processing unit obtains a position where the first fluid body traverses the laser beam using the scan intensity signal, and visualizes the flow of the second fluid body in the flow field based on the obtained position.

More preferably the processing unit obtains a position on a time axis where the scan intensity signal is less than a set threshold, and specifies the position where the first fluid body traverses the laser beam based on the obtained position.

The laser beam supply unit may include: a laser beam source; a galvano mirror that reflects a laser beam emitted from the laser beam source; and a parabolic mirror that reflects the laser beam reflected by the galvano mirror in a manner such that the laser beam is directed toward a given direction in the flow field, for example.

The processing unit preferably obtains a position on the time axis where a value of the scan intensity signal of the laser beam is less than the threshold, and specifies a scan position of the laser beam based on the orientation of the galvano mirror corresponding to the obtained position.

The fluid body supply unit preferably includes a nozzle array in which the nozzle hole is arrayed with a plurality of nozzle holes, each of the nozzle holes supplying the first fluid body to the flow field, and the nozzle array is provided so as to be orthogonal to a direction in which the laser beam traverses the flow field.

Another aspect of the present invention is a fluid body flow visualization method for visualizing a flow of a fluid body around a measuring object. The method includes steps of:

supplying a first fluid body as a tracer from a nozzle hole to a flow field of a second fluid body;

irradiating the flow field with a laser beam having a wavelength optically absorbed by the first fluid body in a manner such that the laser beam traverses the flow field, and controlling the laser beam such that the flow field is scanned by the laser beam;

receiving the laser beam that has passed through the flow field; and visualizing a flow of the second fluid body using a scan intensity signal of the received laser beam.

Preferably, the flow of the second fluid body is visualized, a position where the first fluid body traverses the laser beam is obtained using the scan intensity signal, and the flow of the second fluid body is visualized based on the obtained position.

The position where the first fluid body traverses the laser beam is preferably obtained based on a position on a time axis where a value of the scan intensity signal is less than a set threshold.

Advantageous Effect of Invention

According to the fluid body flow visualization device and visualization method, the flow field can reliably be visualized even for the high-speed fluid body.

DESCRIPTION OF EMBODIMENT

Hereinafter, a fluid body flow visualization device and a visualization method according to an embodiment of the present invention will be described in detail. In the embodiment, carbon dioxide gas is used as a tracer in a wind tunnel. Alternatively, other gases such as water vapor may be used. A flow field of the embodiment is such gaseous flow fields as air in the wind tunnel. Alternatively, a liquid flow field and the like may be used instead of the gaseous flow field. In such cases, a liquid is used for the fluid body tracer.

Figure 1:
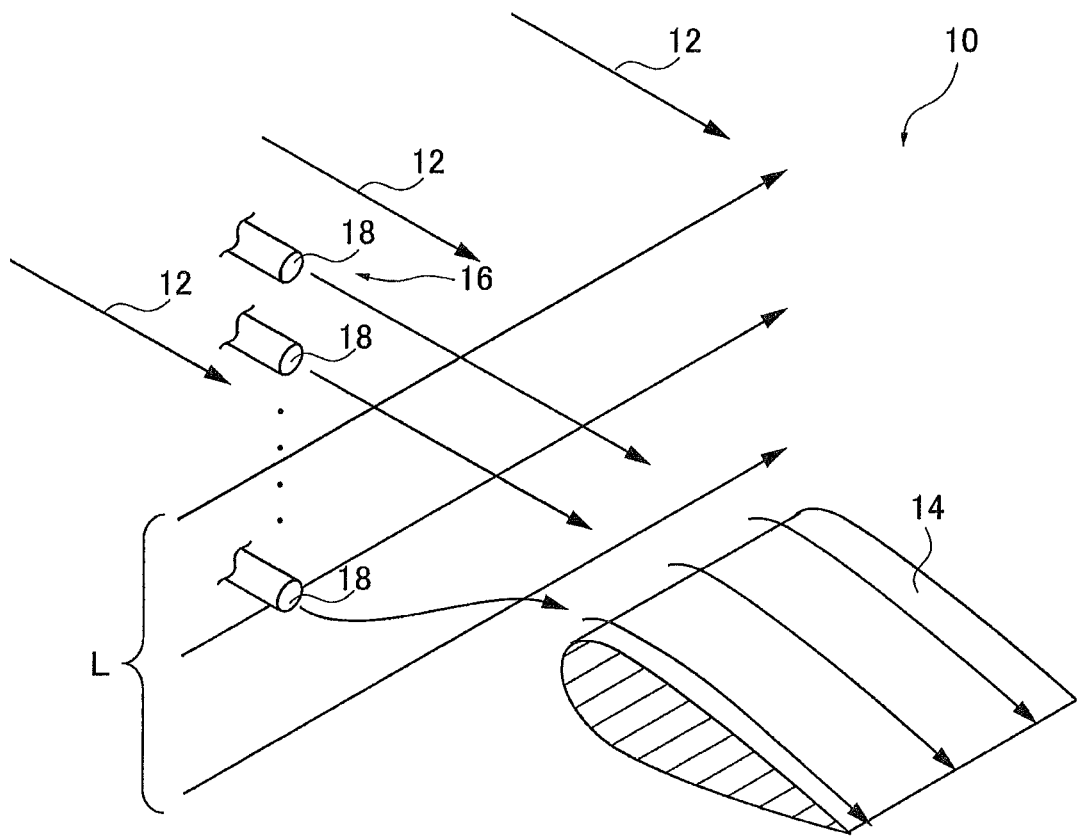
FIG. 1 is a view illustrating a wind tunnel system in which a fluid body flow visualization device according to an embodiment is used.

FIG. 1 is a view illustrating a wind tunnel system 10 in which a fluid body flow visualization device according to the embodiment, which visualizes a flow of the fluid body around a measuring object, is used.

In the wind tunnel system 10, a body that is the measuring object is placed in the fluid-body flow field where a given gas flows, and the flow around the body is visualized.

Specifically, in the wind tunnel system 10, an object 14 is placed in an air flow field 12 where air flows at a constant speed.

Figure 2:
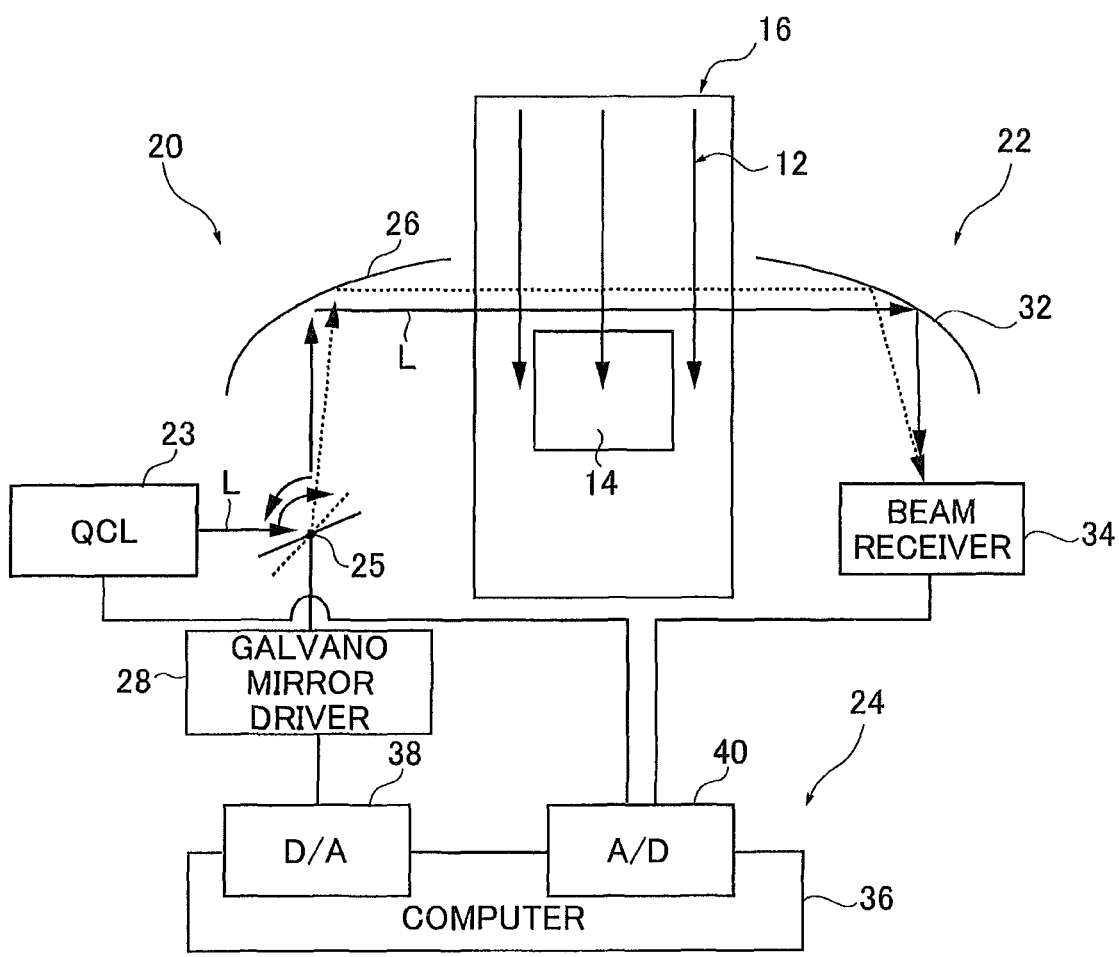
FIG. 2 is a schematic diagram of the fluid body flow visualization device of the embodiment.

FIG. 2 is a view illustrating a schematic configuration of the visualization device. The visualization device includes a fluid body supply unit 16, a laser beam supply unit 20, a beam receiving unit 22, and a control processing unit 24.

The fluid body supply unit 16 supplies carbon dioxide gas that is the tracer from plural nozzle holes 18 to the fluid-body flow field 12. As illustrated in FIG. 1, with the nozzle holes 18 as supply points, the carbon dioxide gas is supplied along the air flow in a direction orthogonal to an irradiation direction of scanning laser beam L. A supply speed of the carbon dioxide gas is adjusted so as to be equal to the air flowing speed. The nozzle holes 18 are connected to a tank (not illustrated) of the carbon dioxide gas. An adjusting mechanism that adjusts the carbon dioxide gas to a predetermined supply speed is provided on the way to the tank. Accordingly, the carbon dioxide gas is supplied into the flow field 12 with the nozzle holes 18 as the supply points and flows along the flow field 12.

The laser beam supply unit 20 includes a laser beam source 23, a galvano mirror 25, a parabolic mirror 26, and a galvano mirror driver 28.

The laser beam source 23 emits a laser beam L having a wavelength optically absorbed by carbon dioxide. As illustrated in FIG. 2, a Quantum Cascade Laser (QCL) is employed as the laser beam source 23. For example, the QCL emits the laser beam L having a wavelength of 4.3 µm. The wavelength of 4.3 µm of the laser beam L is optically absorbed by the carbon dioxide.

The galvano mirror 25 directs the laser beam L emitted from the laser beam source 23 toward the parabolic mirror 26 while changing a reflection angle of the laser beam L. An orientation of a reflection surface of the galvano mirror 25 is controlled by a control signal transmitted from the galvano mirror driver 28, thereby changing the reflection angle of the laser beam L. As described later, the reflection surface for the laser beam L of the galvano mirror 25 is moved in a manner such that laser beam L is irradiated in a direction orthogonal to a direction in which the nozzle holes 18 are arrayed, and the flow field 12 is scanned with the laser beam L in a planar manner. In FIG. 2, for the sake of convenience, the flow field 12 is scanned with the laser beam L in a direction between upstream side and downstream side. However, in the embodiment, the flow field 12 is scanned with the laser beam L in the direction orthogonal to the flow of the flow field 12 as illustrated in FIG. 1.

The parabolic mirror 26 includes a reflection surface that changes the direction of the laser beam L reflected by the galvano mirror 25 to a given direction in the flow field 12. A position where the laser beam L is incident to the parabolic mirror 26 is changed by the change in reflection angle of the galvano mirror 25. The parabolic mirror 26 is provided in a manner such that a focal point of the parabolic mirror 26 is matched with a position where the laser beam L is reflected on the galvano mirror 25. Accordingly, the laser beam L reflected by the parabolic mirror 26 moves in parallel in the flow field 12 by changing the reflection angle of the galvano mirror 25. Accordingly, the galvano mirror driver 28 controls the orientation of the reflection surface of the galvano mirror 25, which allows the flow field 12 to be scanned with the laser beam L in the array direction of the nozzle holes 18 while the irradiation direction of the laser beam L is maintained.

In response to an instruction of the control processing unit 24 to be described later, the galvano mirror driver 28 generates a control signal and transmits the control signal to the galvano mirror 25.

The beam receiving unit 22 includes a parabolic mirror 32 and a beam receiver 34.

The parabolic mirror 32 has the focal point on one point on a beam receiving surface of the beam receiver 34 and is provided in a manner such that the laser beam L traversing across the flow field 12 is caused to converge to the one point on the beam receiving surface of the beam receiver 34. Accordingly, the beam receiver 34 receives the laser beam L with which the flow field 12 is scanned.

The beam receiver 34 receives the laser beam L. For example, in a case that the laser beam L has a wavelength in the infrared range, a beam receiving device of the beam receiver 34 is made of InSb (indium antimony). Accordingly, the beam receiver 34 outputs a scan intensity signal according to an intensity of the received laser beam L.

The control processing unit 24 includes a computer 36, a D/A converter 38, and an A/D converter 40.

The computer 36 issues an instruction to the galvano mirror driver 28 to control the orientation of the reflection surface of the galvano mirror 25, and also performs the following processing using a digital signal of the scan intensity signal output from the beam receiver 34 to obtain spatial positions where the carbon dioxide gas supplied from the plural nozzle holes 18 traverse the laser beams L. Thus, the computer 36 visualizes the air flow in the flow field 12.

The instruction and processing of the computer 36 are performed by calling and executing a program stored in a memory (not illustrated) of the computer 36. That is, the instruction and the processing are performed by software.

The D/A converter 38 converts the instruction signal of the computer 36 into an analog signal, and transmits the analog signal to the galvano mirror driver 28. Thus, the galvano mirror driver 28 generates the control signal controlling the reflection surface of the galvano mirror 25.

The A/D converter 40 converts the scan intensity signal output from the beam receiver 34 into the digital signal. The A/D converter 40 takes in a driving signal for the laser beam L of the laser beam source 23 and converts the driving signal into the digital signal in order to monitor the driving signal and to use the driving signal as a trigger signal of the processing to be described later.

Figure 3:
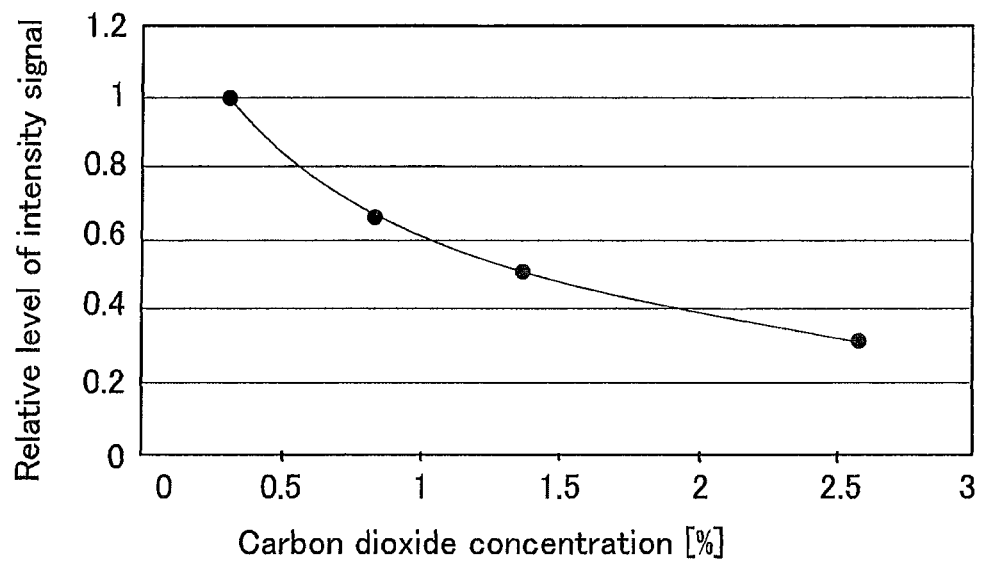
FIG. 3 is a view illustrating a relationship between a concentration of carbon dioxide gas and a relative level of an intensity signal of a laser beam.

Based on the scan intensity signal output from the A/D converter 40, the computer 36 specifies the position where the carbon dioxide gas traverses the laser beam L in the flow field 12. Therefore, the position where the carbon dioxide gas supplied from the nozzle holes 18 passes can be known. FIG. 3 illustrates a relationship between a concentration of the carbon dioxide gas and a relative level (it is assumed that the carbon dioxide gas having the concentration of 0.3% is set to level of 1.0) of the intensity signal of the QCL. As can be seen from FIG. 3, the relative level of the intensity signal decreases with increasing carbon dioxide concentration. Accordingly, a threshold of the intensity signal is set according to the concentration of the carbon dioxide gas supplied from the nozzle holes 18, on the grounds that the supplied carbon dioxide gas flows along the flow field 12 and that part of the carbon dioxide gas diffuses to decrease the concentration of the carbon dioxide gas along the flow field 12. On a time axis of the intensity signal, the computer 36 extracts a position where the intensity signal is less than the threshold. Based on the extracted position, the computer 36 specifies the spatial point where the carbon dioxide gas traverses the laser beam L.

Figure 4A:
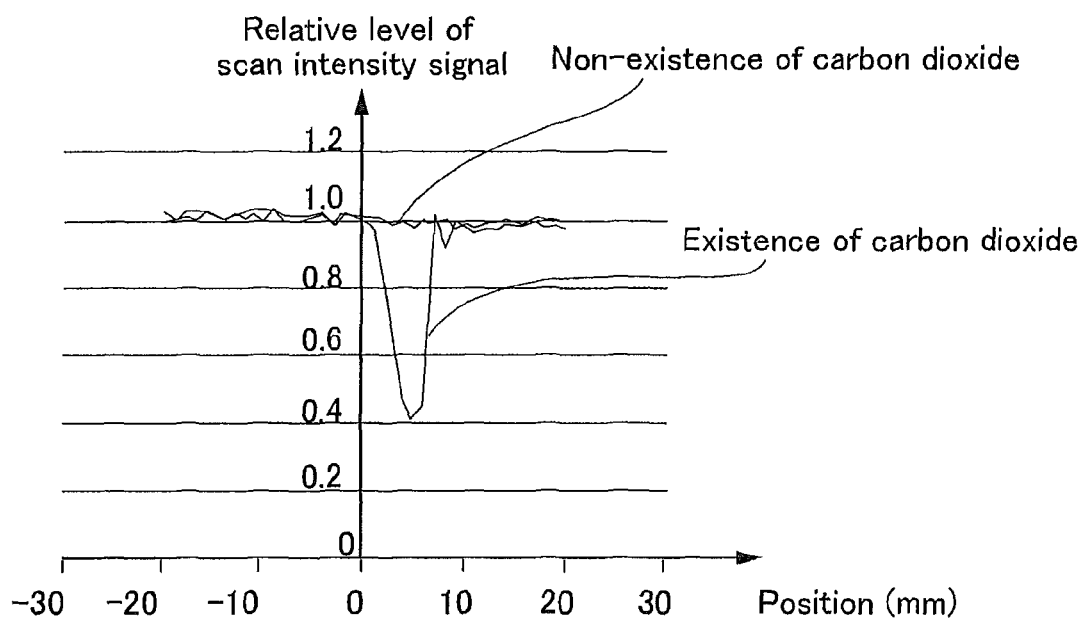
FIG. 4A is an actual measurement example of a scan intensity signal when the laser beam traverses a flow of the carbon dioxide gas.
Figure 4B:
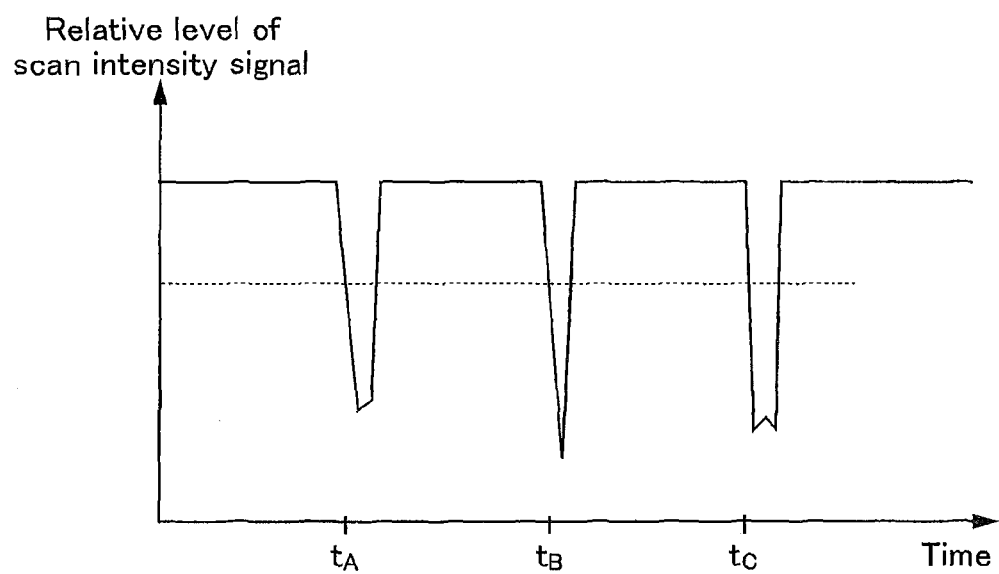
FIG. 4B is a view schematically illustrating an example of the scan intensity signal obtained by the fluid body flow visualization device of the embodiment.

FIG. 4A is an actual measurement example of the scan intensity signal when the laser beam L traverses the flow of the carbon dioxide gas, and FIG. 4B is a view schematically illustrating an example of the scan intensity signal obtained by performing the scan with the laser beam L. In FIG. 4A, a horizontal axis indicates the spatial position when the scan is performed with the laser beam L, a vertical axis indicates the scan intensity signal relative to the level of the intensity signal when the carbon dioxide gas does not flow, and a difference between the existence and non-existence of the carbon dioxide gas can be seen. The spatial position is a value obtained by converting the orientation of the reflection surface of the galvano mirror 25.

The computer 36 obtains the scan intensity signal relative to the level of the intensity signal of the carbon dioxide gas having the concentration of 0.3% from the scan intensity signal, compares the level of the scan intensity signal to the level of the threshold, and extracts a position on the time axis where the value of the scan intensity signal is less than the set threshold.

The positions at time points $t_A$, $t_B$, and $t_C$ on the time axis are extracted in the example in FIG. 4B. The three positions correspond to the spatial positions where the carbon dioxide gas supplied from the three nozzle holes 18 among the nozzle holes 18 arrayed in line as illustrated in FIG. 1 traverse the laser beams L. Generally the flow neither diverges nor converges in the flow field. Therefore, the spatial positions corresponding to the time points $t_A$, $t_B$, and $t_C$ on the time axis, which have been obtained by the scan, corresponds to the positions where the carbon dioxide gas supplied as the tracer from the nozzle holes 18 of the nozzle array pass.

On the other hand, the computer 36 controls the orientation of the reflection surface of the galvano mirror 25, so that the position where the laser beam L traverses the flow field 12 can be specified based on the orientation of the reflection surface of the galvano mirror 25. That is, an angle of the reflection surface of the galvano mirror 25 can be correlated with the position where the laser beam L traverses the flow field 12. That is, the computer 36 can obtain the position that is irradiated with the laser beam L in the flow field 12 based on the orientations of the reflection surface of the galvano mirror 25, which correspond to the extracted time points $t_A$, $t_B$, and $t_C$. Accordingly, the computer 36 can specify the spatial positions where the carbon dioxide gas supplied from the nozzle holes 18 arrayed in line traverse the laser beams L.

In the flow field 12, the spatial position of the carbon dioxide gas, which is discharged from the nozzle holes 18 to flow in the flow field 12, can be specified by moving the position where the planar, scan is performed with the laser beam L in the upstream or downstream direction of the flow field 12, and the flow visualization, for example, the streamline can be obtained by connecting the positions as a continuous line. The laser beam supply unit 20 and beam receiving unit 22 of the embodiment have mechanisms that move the laser beam supply unit 20 and the beam receiving unit 22 in the upstream or downstream direction of the flow field 12, respectively.

A result of the visualization is displayed as an image on a display (not illustrated) of the computer 36.

In the embodiment, the flow of the flow field 12 is visualized using the one laser beam L. Alternatively, the flow of the flow field 12 may be visualized and therefore the streamline may be obtained using plural scan intensity signals that are obtained by performing the scan with the plural laser beams L located at various positions on the upstream and downstream sides in the flow field 12.

In the wind tunnel system 10, first the fluid body supply unit 16 supplies the carbon dioxide gas as the tracer from the nozzle holes 18 into the air flow field 12.

Then the laser beam supply unit 20 irradiates the flow field 12 with the laser beam L in a manner such that the laser beam L having the wavelength optically absorbed by the carbon dioxide gas traverses the flow field 12. At this point, the irradiation position of the laser beam L is controlled by controlling the orientation of the reflection surface of the galvano mirror 25 in a manner such that the flow field 12 is scanned by the laser beam L.

On the other hand, the beam receiving unit 22 that is provided at the position on the opposite side of the laser beam supply unit 20 across the flow field 12 receives the laser beam L with which the flow field 12 has been scanned.

The scan intensity signal of the received laser beam L is converted into the digital signal by the A/D converter 40, and taken in by the computer 36. The driving current of the laser beam source 23, which is sent to the A/D converter 40, is also digitalized and taken in by the computer 36 in order to monitor the intensity of the laser beam L.

As illustrated in FIG. 4B, the value of the scan intensity signal taken in by the computer 36 is compared to the previously-set threshold, the position on the time axis where the value of the scan intensity signal is less than the set threshold is extracted, and the position where the carbon dioxide gas traverses the laser beam L is specified from the extracted position. The flow field 12 is scanned with the laser beam L while changing the position where the flow field 12 is scanned with the laser beam L in the planar manner toward the upstream or downstream side in the flow field 12, which allows the position where the carbon dioxide gas flows to be obtained from the upstream side to the downstream side in the flow field 12. Accordingly, the streamline in the flow field 12 can be obtained.

In the embodiment, the spatial position of the carbon dioxide gas is specified using the previously-set threshold. However, the spatial position of the carbon dioxide gas is not necessarily specified. For example, the scan intensity signal of the carbon dioxide gas is obtained at each of the spatial positions from the upstream side to the downstream side in the flow field 12, the scan intensity signal corresponding to the spatial position is allocated to the space while correlated with the scan position, and color coding is performed according to the value of the scan intensity signal, thereby being able to know a concentration distribution of the carbon dioxide gas that is supplied from plural nozzle holes 18 to flow along the flow field 12. Accordingly, the concentration distribution can also be displayed as the visualized image of the flow field 12 on the display (not illustrated) of the computer 36.

As described above, in the embodiment, the carbon dioxide gas supplied from the nozzle holes is used as the tracer, and the flow field 12 is irradiated with the laser beam L having the wavelength optically absorbed by the carbon dioxide gas so as to be scanned with the laser beam L, so that the flow field 12 can be visualized by specifying the position where the carbon dioxide gas traverses the laser beam L. Particularly, the intensity of the laser beam L that is decreased by the optical absorption by the carbon dioxide gas can be obtained with high accuracy. Therefore, the flow field 12 can reliably be visualized even for the high-speed fluid body. Additionally, because the carbon dioxide gas is used, the carbon dioxide gas used as the tracer can escape into the atmosphere, but it is not necessary to recover the tracer unlike the conventional way.

The computer 36 extracts the position on the time axis where the value of the scan intensity signal of the laser beam L is less than the set threshold, and the computer 36 specifies, from the extracted position, the spatial position where the carbon dioxide gas traverses the laser beam L. Thereby, the position of the carbon dioxide gas can be easily extracted.

Since the laser beam supply unit 20 of the present embodiment employs the laser beam source 23, the galvano mirror 25 that reflects the laser beam L emitted from the laser beam source 23, and the parabolic mirror 26 that reflects the laser beam L reflected by the galvano mirror 25 in a manner such that the laser beam L is directed toward a given direction in the flow field 12, the flow field 12 can be easily scanned with the laser beam L in order to know the spatial position of the carbon dioxide gas.

The computer 36 obtains the position on the time axis where the value of the scan intensity signal of the laser beam L is less than the threshold, and specifies the scan position of the laser beam L based on the orientation of the galvano mirror 25 corresponding to the position on the time axis, so that the spatial position of the carbon dioxide gas can relatively easily be specified by previously correlating the scan position with the position of the scan intensity signal on the time axis.

Since the carbon dioxide gas is supplied by the nozzle array of the plural nozzles 18 arrayed in line, and the nozzle array is provided so as to be orthogonal to the direction in which the laser beam L traverses the flow field 12 in the embodiment, the plural positions where the carbon dioxide traverses the laser beam L can simultaneously be obtained by scanning the flow field 12 with the laser beam L. Therefore, the flow of the flow field 12 is efficiently visualized.

In the embodiment, the flow field 12 is scanned with the laser beam L using the galvano mirror 25 and parabolic mirror 26 of the laser beam supply unit 20. Alternatively, instead of the galvano mirror 25 and the parabolic mirror 26, a micro mirror device in which plural minute mirrors are disposed on a plane may be employed as the scanning device of the laser beam L.

Although the fluid body flow visualization device and visualization method of the present invention are described above, the present invention is not limited to the embodiment, but various improvements and changes can be made without departing from the scope of the present invention.

REFERENCE SIGNS LIST

10 wind tunnel system
12 flow field
14 body
16 fluid body supply unit
18 nozzle hole
20 laser beam supply unit
22 beam receiving unit
23 laser beam source
24 control processing unit
25 galvano mirror
26, 32 parabolic mirror
28 galvano mirror driver
34 beam receiver
36 computer
38 D/A converter
40 A/D converter

The invention claimed is:

1. A fluid body flow visualization device for visualizing a flow of a fluid body around a measuring object, the device comprising:
    a fluid body supply unit operable to supply a first fluid body as a tracer from a nozzle hole to a flow field of a second fluid body, the fluid body supply unit including a nozzle array in which the nozzle hole is arrayed with a plurality of nozzle holes, with each of the nozzle holes supplying the first fluid body to the flow field;
    a laser beam supply unit operable to irradiate the flow field with a laser beam having a wavelength optically absorbed by the first fluid body in a manner such that the laser beam traverses the flow field, and operable to control an irradiation position of the laser beam in a manner such that the flow field is scanned;
    a beam receiving unit operable to receive the laser beam which has traversed the flow field; and
    a processing unit operable to visualize a flow of the second fluid body in the flow field using a scan intensity signal of the received laser beam;
    the nozzle array being provided so as to be orthogonal to a direction in which the laser beam traverses the flow field; and
    the flow field is scanned with the laser beam in an array direction of the nozzle holes.

2. The fluid body flow visualization device according to claim 1, wherein the processing unit obtains a position where the first fluid body traverses the laser beam using the scan intensity signal, and visualizes the flow of the second fluid body in the flow field based on the obtained position.

3. The fluid body flow visualization device according to claim 2, wherein the processing unit obtains a position on a time axis where the scan intensity signal is less than a set threshold, and specifies the position where the first fluid body traverses the laser beam based on the obtained position.

4. The fluid body flow visualization device according to claim 1, wherein the laser beam supply unit includes: a laser beam source; a galvano mirror that reflects a laser beam emitted from the laser beam source; and a parabolic mirror that reflects the laser beam reflected by the galvano mirror in a manner such that the laser beam is directed toward a given direction in the flow field.

5. The fluid body flow visualization device according to claim 4, wherein the processing unit obtains a position on the time axis where a value of the scan intensity signal of the laser beam is less than the threshold, and specifies a scan position of the laser beam based on the orientation of the galvano mirror corresponding to the obtained position.

6. A fluid body flow visualization method for visualizing a flow of a fluid body around a measuring object, the method comprising:
   supplying first fluid body as tracer from each of plural nozzle holes which are arrayed in line to a flow field of a second fluid body;
   irradiating the flow field with a laser beam having a wavelength optically absorbed by the first fluid body in a manner such that the laser beam traverses the flow field in a direction orthogonal to a direction in which the plural nozzle holes are arrayed, and controlling the laser beam such that the flow field is scanned by the laser beam in an array direction of the nozzle holes;
   receiving the laser beam that has passed through the flow field; and
   visualizing a flow of the second fluid body using a scan intensity signal of the received laser beam.

7. The fluid body flow visualization method according to claim 6, wherein when the flow of the second fluid body is visualized, a position where the first fluid body traverses the laser beam is obtained using the scan intensity signal, and the flow of the second fluid body is visualized based on the obtained position.

8. The fluid body flow visualization method according to claim 7, wherein the position where the first fluid body traverses the laser beam is obtained based on a position on a time axis where a value of the scan intensity signal is less than a set threshold.

9. The fluid body flow visualization device according to claim 1, further comprising an arranging unit operable to arrange the measuring object in the flow field,
   wherein a cross-sectional shape of the object varies in a direction in which the second fluid body flows and extends in a direction orthogonal both to the direction in which the second fluid body flows and to the direction in which the array direction of the nozzle holes, and
   the fluid body supply unit supplies the first fluid body in the flow field in which the measuring object is arranged.

10. The fluid body flow visualization method for according to claim 6, further comprising arranging the measuring object in the flow field,
    wherein a cross-sectional shape of the measuring object varies in a direction in which the second fluid body flows and extends in a direction orthogonal both to the direction in which the second fluid body flows and to the direction in which the array direction of the nozzle holes, and
    the first fluid body in the flow field in which the measuring object is arranged is supplied in the supplying.

11. The fluid body flow visualization device according to claim 1, wherein the flow field is scanned by the laser beam such that the first fluid body supplied from all the nozzle holes which are included in the nozzle array traverse the laser beam.

12. The fluid body flow visualization method for according to claim 6, wherein the laser beam is controlled such that the first fluid body supplied from all the nozzle holes which are included in the nozzle array traverse the laser beam.

* * * * *